July 19, 1966  E. J. STRAITS  3,261,640

MODULAR FURNITURE

Filed Oct. 20, 1964

INVENTOR.
Ernest J. Straits
By William P. Porcelli
ATTORNEY

July 19, 1966  E. J. STRAITS  3,261,640
MODULAR FURNITURE
Filed Oct. 20, 1964  7 Sheets-Sheet 4

INVENTOR.
Ernest J. Straits
By William P. Porcelli
ATTORNEY.

July 19, 1966  E. J. STRAITS  3,261,640
MODULAR FURNITURE
Filed Oct. 20, 1964  7 Sheets-Sheet 6

INVENTOR.
Ernest J. Straits
BY William P. Bieller
ATTORNEY.

United States Patent Office 3,261,640
Patented July 19, 1966

3,261,640
MODULAR FURNITURE
Ernest J. Straits, St. Charles, Ill., assignor to Interlake Steel Corporation, a corporation of New York
Filed Oct. 20, 1964, Ser. No. 405,153
9 Claims. (Cl. 297—135)

This invention relates to the art of furniture construction and particularly to improvements in a multiple seating and table type of furniture.

Although many styles and types of furniture are available for use in reception rooms of offices, stores, industrial plants, airports, and the like, there seems a need for such furniture which is durable, versatile in arrangement, readily adaptable and changeable to different size and shape rooms, pleasant in appearance, and economical to manufacture, sell and ship.

In order to meet these requirements, it is an important object of this invention to provide a furniture construction which is divided into furniture units of either seats, table tops, bench tops, or the like, rigidly connected together by incremental rigid support frame members which have fastening locations thereon at space intervals corresponding to the intended locations of the functional units thereon.

It is still another object to provide such furniture wherein each of said parts has a particular size, shape and relationship to the others which readily allows for versatility of arrangement of the parts in different arrangement patterns with economy of the number of parts used.

It is another object of the invention to provide furniture of the type described which is readily adapted to either straight line or non-rectilinear for U-shape, rectangular or arrangements, which can be disassembled and reassembled into different patterns of arrangement as desired.

It is still another object of the invention to provide a furniture structure as mentioned which readily lends itself to contemporary design embodying functional units of relatively simple construction.

It is still another object of the invention to provide such furniture which has similar connection portions for each basic element connected together in the units and for connecting the units together to facilitate constructing the furniture in rearranged sequential patterns of its units.

It is another object of this invention to provide an improved connection between a functional unit and the frame member which supports it, the connection being in the form of a plate having a first web portion facing upward connected to a second web portion extending downwardly and the second web portion having a notch to permit the plate to fit over the frame member. The notch is bordered by at least a single tab which is connected to the frame member by a fastener. For further stability, two plates spaced from each other along the frame member can be used.

Other objects and advantages should become apparent upon reference to the accompanying drawings in which.

Figures 1, 2, 3, 4:
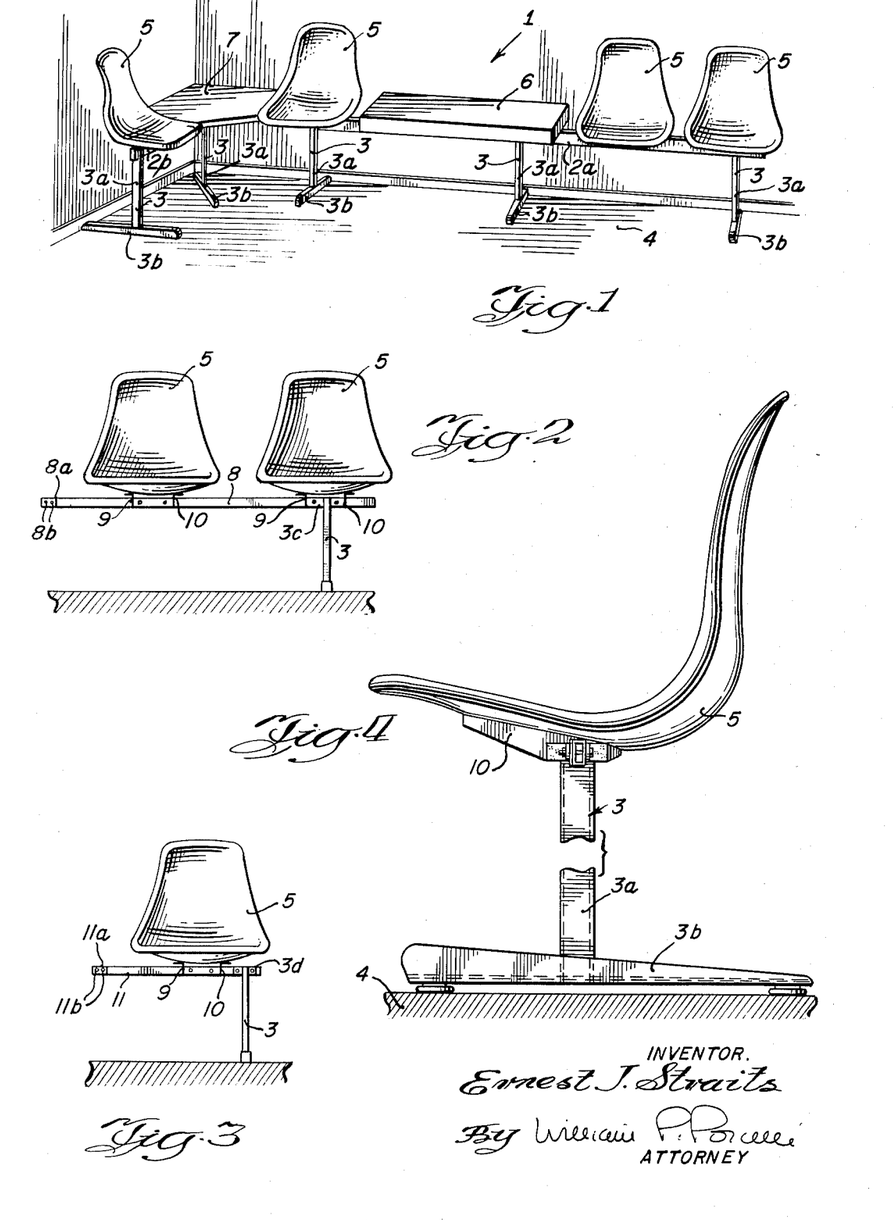
FIG. 1 shows a perspective view of one embodiment of the invention.
FIG. 2 shows a modular unit of furniture which is to be connected to another modular unit for the purpose of lengthening the furniture structure and is shown with 2 seat units.
FIG. 3 shows a modular unit similar to that as shown in FIG. 2, but with only 1 seat unit.
FIG. 4 shows a right end view of the modular unit as shown in either FIG. 2 or FIG. 3.

In FIG. 1 is shown one form of a furniture construction embodying the features of this invention. The furniture unit 1 consists of a main frame portion 2 which has one longitudinal portion 2a connected at right angles to another longitudinal frame portion 2b. These frame portions 2a and 2b are supported by five legs 3 a suitable distance above the floor or other supporting surface 4. The legs 3 have vertical post portions 3a connected in an inverted T-shape to horizontal foot members 3b which actually rest on the floor 4. This particular structure shown in FIG. 1 is also provided with functional furniture units disposed above the frame member 2 and secured thereto by improved connecting means. The functional furniture members shown are four seat units 5, a bench unit 6 and a corner table unit 7. Other arrangements of functional furniture units are readily construced as hereinafter described.

Certain of the basic modular units which may be assembled together in different units are shown in FIGS. 2, 3, 5, 6, 7, 8, 9 and 10. In FIG. 2 is shown a modular unit having two seat units 5 disposed above it and connected thereto. It also has connected to it a leg 3 of the type shown in FIG. 1. The seat units are secured to the frame member 8 by means of two brackets 9 and 10. A feature of this particular modular unit is that the end 8a is provided with two screw holes 8b for allowing it to be connected end to end with another frame member. In addition, the leg 3 is of a type having an upper end 3c provided with fastening holes corresponding to the spacing of fastening holes in the frame 8 used to connect the two brackets 9 and 10 used to secure one of the seat units 5 to the frame 8. In this manner, the same fasteners can be used to connect both the leg 3 and the seat brackets 9 and 10 to the frame member 8.

In FIG. 3 is a unit somewhat similar to FIG. 2, except that the frame member 11 is shorter to accommodate only a single seat unit 5. In a similar manner, its left end 11a is provided with two screw holes 11b to accommodate it for connection lengthwise of another frame member. The leg member 3 is provided with a different upper bracket 3d for connection directly to the frame member 11, instead of by connecting in combination with the seat brackets 9 and 10.

Figure 5:
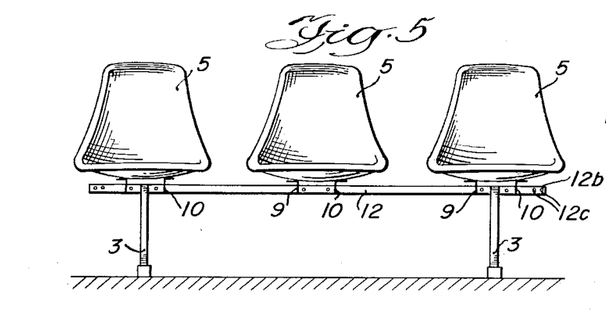
FIG. 5 shows still another modular unit incorporating three seat units.

In FIG. 5, another basic modular unit is shown as comprising a frame member 12 having three seat units 5 disposed above it and connected to it by means of seat brackets 9 and 10. Likewise, following the structure as shown in FIG. 2, the legs 3 are joined to the frame member 12 in cooperative relationship with the seat brackets 9 and 10 for the sake of minimizing the numbers of fasteners required. Also, this frame member 12 is provided at both of its ends 12a and 12b with screw holes 12c for the purpose of connecting the frame member 12 to adjacent frame members 12 for extension of the furniture unit.

Figure 6:
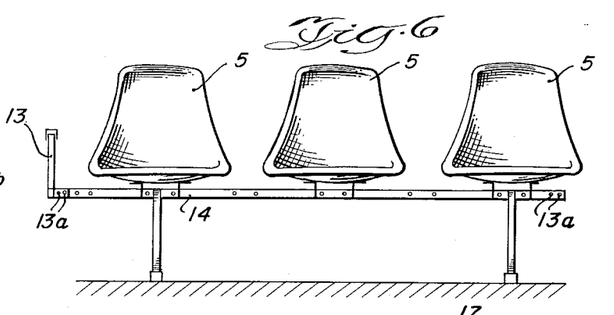
FIG. 6 shows another modular unit similar to FIG. 5, except that it is provided with three seat units and one arm rest.

FIG. 6 shows a unit quite similar to FIG. 5 except that its left end is provided with an arm rest 13 which has been connected by means of screws 13a extending through the lower end portions of the arm rest 13 and the left end of the frame member 14. The lower portion of the arm rest 13 is forked to provide a flat portion along both sides of the frame member 14. The frame member 14 can easily be provided as a forked member which has portions on both sides of the arm rest portion. In either case, the connection is of a tongue and groove type and the selection of which portion carries the tongue and groove is a matter of choice. The right end of the frame member 14 is also provided with screw holes 13a which can be used to connect this unit to another frame member.

Figures 7, 8, 9, 10, 11:
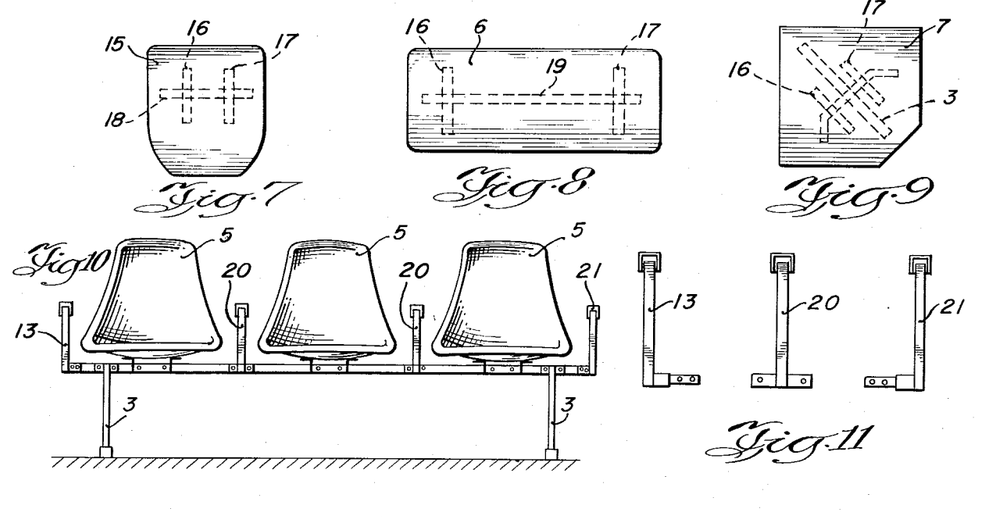
FIGS. 7, 8 and 9 show top plan views of table or bench units which can be incorporated as part of the final structure.
FIG. 10 shows still another form of modular unit employing three seat units and four arm rests.
FIG. 11 shows the three forms of arm rests employed in the unit of FIG. 10.

FIG. 7 shows a flat table unit 15 which can be used intermediate between seat members 5 or bench members 16, as shown in FIG. 8. The table unit 15 is provided with two brackets 16 and 17 secured to a short frame member 18. The frame member is the same type as shown in FIG. 1, and is provided with screw holes at its ends so that it can be suitably connected to another frame member. As an alternative, the one frame member 18 can be eliminated and the brackets 16 and 17 can be secured directly to a longer frame member, such as frame member 12. This would permit the table member 15 to be used in place of a seat member 5 and might be positioned in place of the middle seat member 5 shown in FIG. 5, although it is adaptable to replacement of any of the seat members 5. It should be noted that the brackets 16 and 17 for the table member 15 are spaced on the table member 15 the same distance apart as the brackets 9 and 10 are on the seat members 5. This provides the degree of interchangability required for versatile arrangements of the seat units and the table units on the frame members.

In FIG. 8 is shown the bench unit 16 which may be of a hard surface or padded and provided with two brackets 16 and 17 identical to those shown in FIG. 7. These brackets 17 can be attached to a short frame member 19 provided with screw holes at its ends to enable it to be connected to other frame members, or the frame member 19 need not be provided. Instead, the brackets 16 and 17 can be positioned directly on another frame member in place of two seat units 5. The spacing of the brackets 16 and 17 is pre-arranged to be identical to the spacing of holes in a frame member for accommodation of two seat brackets 9 and 10. A comparison of the table unit 15 and the bench unit 6 indicates the versatility of the form of construction because the table unit 15 corresponds to what might be termed a single modular space which is the same space required for a seat unit 5, while the bench unit 6 corresponds to a double space unit corresponding to the space required for two seat units 5. The frame members used are always provided with holes which accommodate both the seat units or the table or bench units. In this way the units can be shifted from one place to another in a large number of arrangements.

FIG. 9 shows the corner table unit 7 indicated in FIG. 1 and it is provided with two brackets 16 and 17 of the same construction as those shown in FIGS. 7 and 8. They are spaced from each other to correspond to the spacing of the brackets 9 and 10 for a seat unit.

Figure 12:
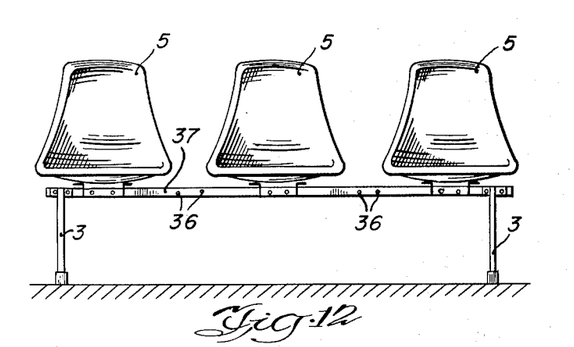
FIG. 12 shows still another form of unit employing three seat units.
Figure 13:
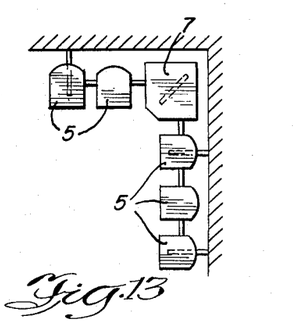
FIGS. 13 through 19 show top plan view arrangements in simplified diagrammatic form of various arrangements of the separate modular units.

In FIGS. 10 and 12 are shown two three-seat units. The unit of FIG. 10 includes a longer frame member to accommodate the arm rests shown while the unit of FIG. 12 does not contain arm rests. The arm rests shown in FIG. 10 are the same as those of FIG. 11. There is the left arm 13, two middle arms 20 and a right arm 21. The lower portions of these arms are provided with suitable brackets of a tongue or groove type and screw holes to appropriately mount and be secured upon a frame member. The bottom bracket portion of the left arm rest 13 extends to the right so that it can be connected to the left end of a frame member, the lower bracket portion of the arm rest 20 extends from both sides of it and is of an inverted channel shape so that it can mount over a frame member from its top. The lower bracket portion of the arm rest 21 is either tongued or grooved and provided with screw holes which are on the left of it so that it can be connected to the right end of a frame member.

In all of the references to right or left directions mentioned herein, they are with respect to the views as shown. Actually, when the furniture units are in use, what may be referred to as the right side with respect to a particular view may actually be the left side relative to the position a person assumes in normal use on a seat unit 5, for example.

Figure 27:
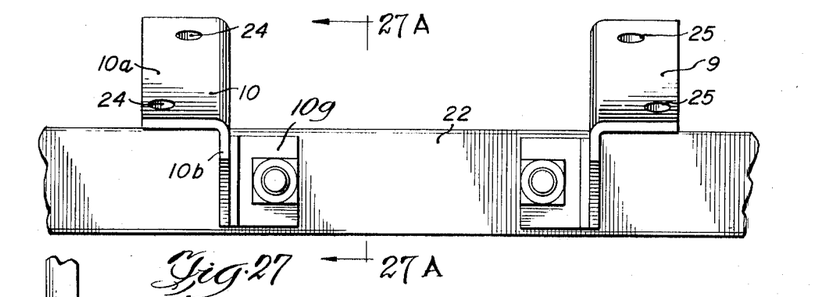
FIG. 27 shows a front elevation of a portion of the main frame member of a modular unit provided with two brackets used to support a seat unit.
Figure 27A:
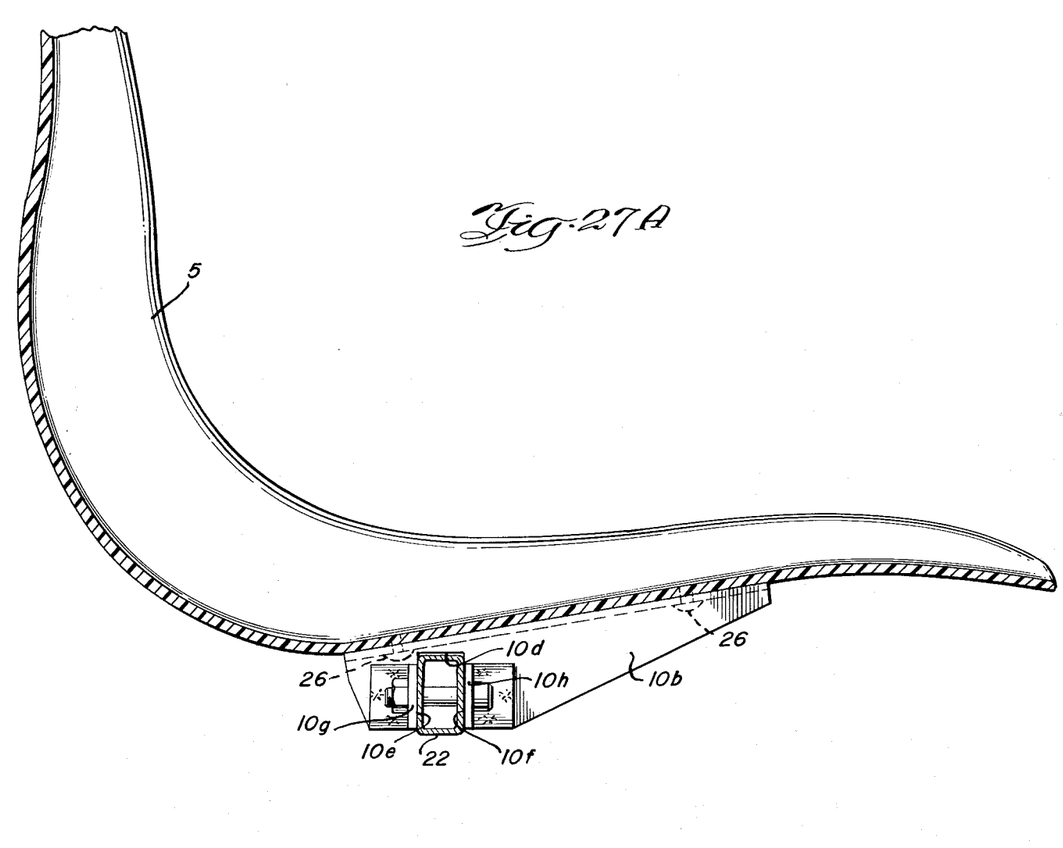
FIG. 27A shows a sectional view along the line 27A—27A of FIG. 27 to provide a side view of one of the seat brackets.

In FIGS. 27 and 27A is particularly indicated the structure and specific connections of the seat brackets 9 and 10. The seat bracket 10 is shown as a flat piece bent into an L-shaped cross-section having a top web portion 10a and a downwardly depending web portion 10b connected together along a folded edge 10c. The web portion 10b is provided with a notch 10d which has one of its edges 10e spaced from its opposite edge 10f by an amount equal to the width of frame member 22 which is a hollow substantially rectangular shaped tube like the frame member 2 indicated in FIG. 1. The depth of the notch 10d is sufficient to fully engage the frame member 22 with the seat bracket 10. The web portion 10b is provided with two tabs 10g and 10h which project laterally away from the web portion 10b. Each of these tabs 10g and 10h are provided with screw holes located to correspond to screw holes extending through the walls of the frame member 22 so that a fastener 23 in the form of a nut and bolt can be secured through the tabs 10g and 10h and the frame member 22. Tightening the fastener draws the tabs 10g and 10h tightly against the frame member 22 to provide a secure connection. If the plate 10 is manufactured of sufficient strength, it is possible to use a single tab 10g or 10h to secure the seat brackets to the frame member 22. However, the use of two tabs provides a more secure connection to minimize the possibility of frontward or backward tilting of the seat unit 5.

As shown in FIG. 27, the bracket 9 is identical in construction to bracket 10 except it is of the opposite hand. Both brackets are provided with holes 24 and 25 through which screws 26 can be passed to connect the brackets 9 and 10 to the seat member 5. The use of two brackets in this manner provides two widely separated supports which prevent tilting of the seat units sidewise. Furthermore, the brackets are of relatively simple and inexpensive construction and easy to connect to both the seat units 5 and the frame member 22 or other similar frame members.

The structures as shown in FIGS. 27 and 27A are what is required to connect a seat unit 5 in a region of the frame member 22 where no leg 3 is mounted. However, if a leg 3 is to be mounted directly beneath the seat unit 5, the construction as shown in FIGS. 22, 23, 24 and 30 is employed. In that situation, the seat brackets 9 and 10 are identical to what is shown in FIGS. 27 and 27A. But, the leg 3 is provided with a bracket 3c secured to its upper end. This bracket 3c is provided with a channel-shaped central portion 3e having tabs 3f projecting from the central portion and spaced a little wider than the width of the central portion 3e. These tabs 3f are provided with holes 3g having a separation from each other the same distance as the holes on the frame member 22 are spaced for the mounting of the seat brackets 9 and 10. In this way, the bracket 3c fits around the bottom and two sides of the frame 22 with the tabs 3f positioned over the tabs 10g and 10h on the brackets 9 and 10 with the holes through all of the tabs and the frame member 22 in alignment with each other. Nuts and bolts 23 are then used to secure both the seat brackets 9 and 10 and the leg bracket 3c to the frame member 22.

Figures 22, 23, 24, 25, 26:
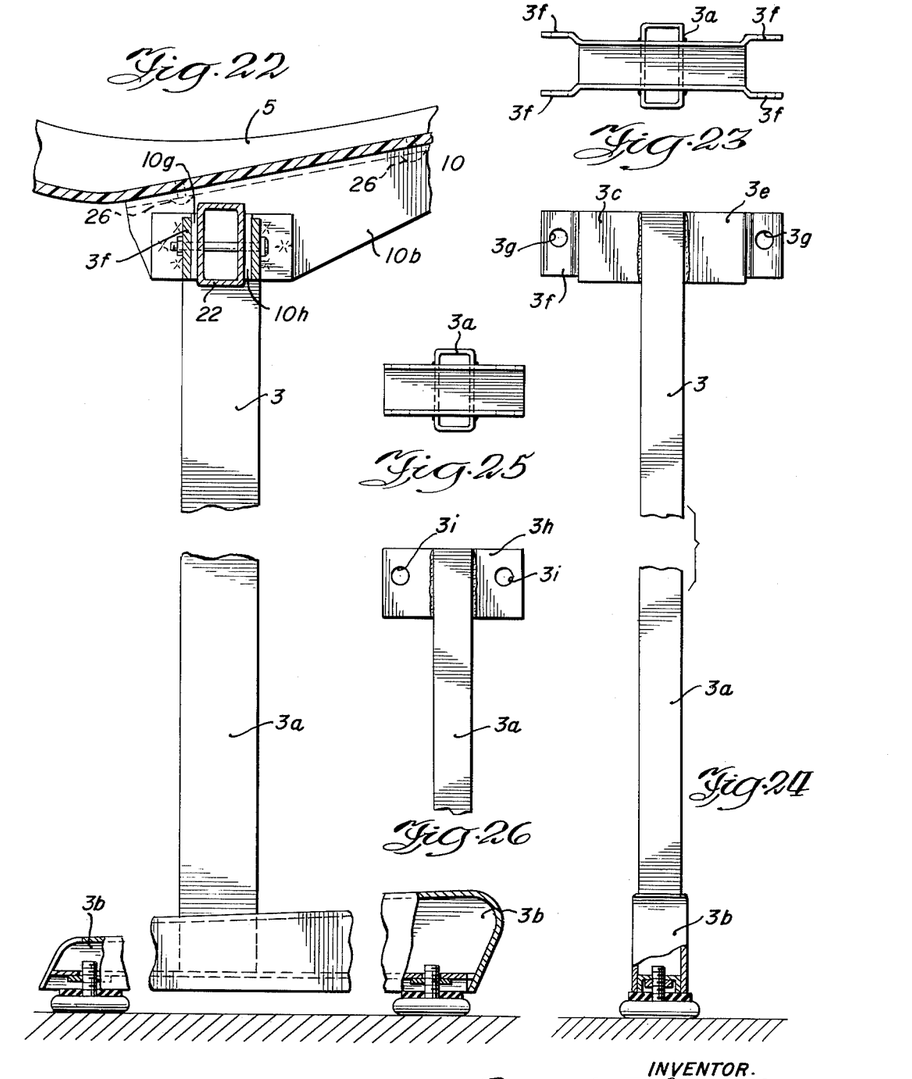
FIG. 22 shows a partially cut away side elevation of a preferred form of leg construction as used to support certain of the modular units.
FIG. 23 shows a top end view of the top end of the leg shown in FIG. 22.
FIG. 24 shows a right side view, partially cut away, of the leg shown in FIG. 22.
FIG. 25 shows a top end view of the top end of an alternate form of leg structure.
FIG. 26 shows a front view of the top portion of the leg shown in FIG. 25.
Figures 28, 29, 30, 31, 32, 33:
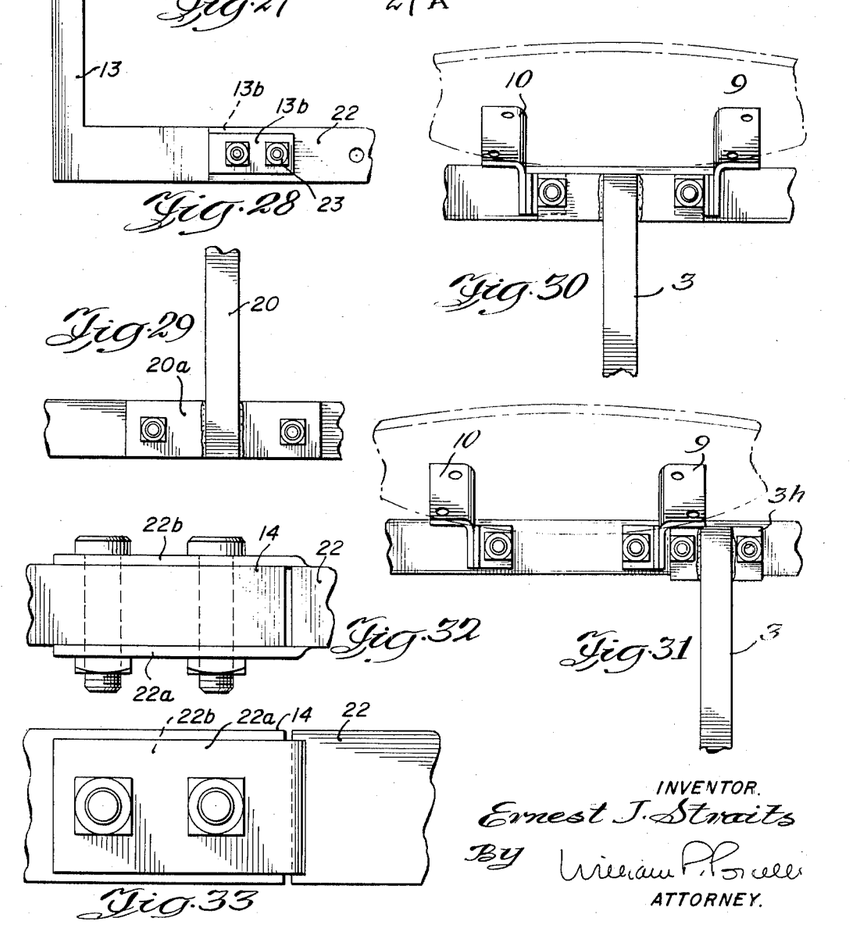
FIGS. 28 through 33 show the various basic connections used between the frame members, the arm rests and the seat units embodied in the invention.

If a leg 3 is to be secured to a frame member 22 independently on the seat brackets 9 and 10, the construction as shown in FIGS. 25, 26 and 31 is employed. The upper end of the leg 3 is provided with a channel shaped bracket 3h similar to the bracket 3c, but without any tabs 3f on its ends. The bracket 3h is directly provided with bolt holes 3i which provide the mounting openings for nuts and bolts 23 corresponding to mounting holes on a frame member 22. No tabs like tabs 3f are required because it is not necessary that the bracket 3h span around the tabs 10g and 10h of the seat brackets 9 and 10.

A left arm rest 13 is secured as specifically shown in FIG. 28. It is provided with two spaced apart parallel tongues 13b and provided with screw holes into which nuts and bolts 23 can be secured to secure the arm rest 13 to a frame member 22. The end of the frame member 22 is positioned between the two tongues 13b and the fasteners 23 clamp the tongue 13b tightly against the frame member 23. The right arm rest 21 is secured in the same manner on the opposite end of a frame member 22 and its construction, as far as the connection is concerned, is identical.

As shown in FIG. 29, a center arm rest 20 has an inverted U-shaped bracket 20a at its lower end. In it are provided screw holes corresponding to the spacing of the screw holes on a frame member provided for the mounting of the seat brackets 9 and 10. This permits the center arm rest to be mounted in the same region of a frame member 22 where a seat member 5 may otherwise be mounted.

The end to end connections of the frame members is shown most clearly in FIGS. 32 and 33. There a frame member 22 is provided with two parallel spaced apart tongues 22a and 22b provided with screw openings corresponding to openings on the opposite end of another frame member 14. The tongues 22a and 22b straddle the frame member 14 and nuts and bolts are secured tightly through the mounting holes to clamp the tongues 22a and 22b tightly against the frame member 14. The spacing of the mounting holes in the ends of these frame members 22 and 14 is identical to the spacing of the mounting holes of the arm rests 13 and 21. The reason for this is so that frame members can either be connected together in endwise relationship or remain disconnected from each other and have arm rests connected instead.

This pre-disposed positioning of holes in different parts to facilitate interchanging or substitution of the placement of functional parts provides a valuable versatility to the structure because it permits many variations to suit the requirements and tastes of those using the furniture structure.

Figure 20:
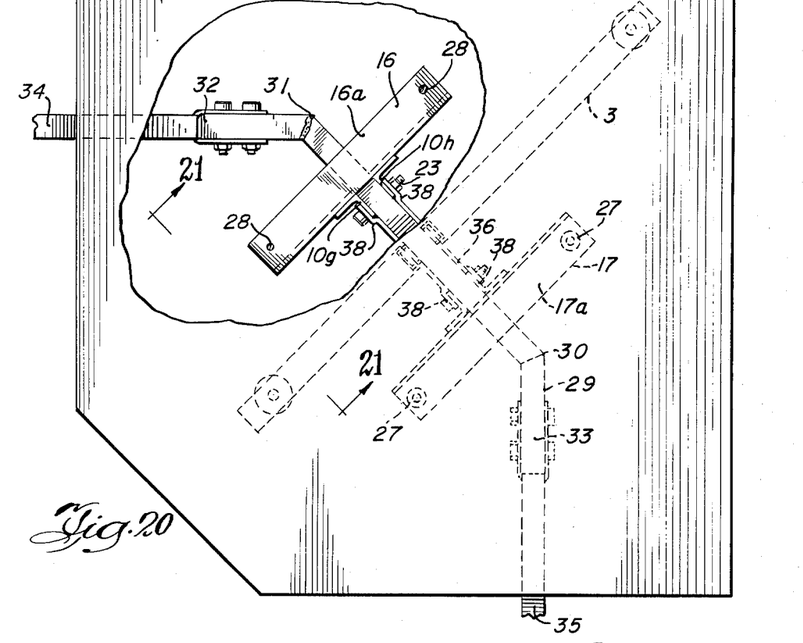
FIG. 20 shows a top plan view, partially cut away, of a table unit and its supporting structure.
Figure 21:
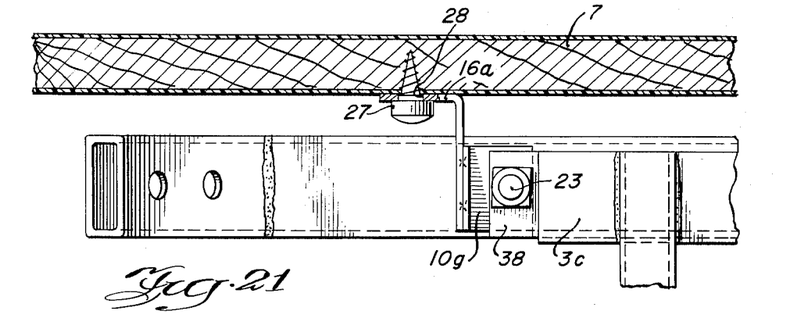
FIG. 21 shows a sectional view along the line 21—21 of FIG. 20.

In FIGS. 20 and 21 there is shown the particular structure for mounting the corner table unit 7 to a position as shown in FIG. 1. The two brackets 16 and 17 provided for mounting the corner table unit 7 are of substantially similar construction to the seat brackets 9 and 10, except that the top web portions 16a and 17a extend in a horizontal direction rather than at an angle as do the seat brackets 9 and 10. The reason for this is that the seat units 5 slope toward the rear to provide a comfortable seat position. The ordinary table members are necessarily horizontal. Other than the direction of the top web portions 16a and 17a, the brackets are identical. Furthermore, the table unit 7 ordinarily requires the support of a single leg 3 and it is preferably mounted centrally of the table unit 7 as shown in FIGS. 9 and 20. In order to do this a leg 3 with the upper bracket construction as shown in FIGS. 22, 23 and 24 is used. The upper bracket 3c on the leg is provided with the tabs 3f which overlap the tabs 10g and 10h identical to the tabs 10g and 10h on the seat brackets 9 and 10. Notches corresponding to the notches 10d of the seat brackets are used and all parts are secured together by means of nuts and bolts 23. The brackets 16 and 17 are secured to the table top by means of screws 27 which extend through holes 28 in the top web portions 16a and 17a. The frame member 29 to which the brackets 16 and 17 and the leg 3 are attached is of the same cross section as the other frame members mentioned. However, it is provided with two obtuse corners 30 and 31 which redirect the ends 32 and 33 of the frame member 29 to extend at right angles to each other. These ends 32 and 33 are provided with fastenerd holes identical to what is shown in FIGS. 32 and 33 and they are connected in an identical manner to other frame members 34 and 35 in the identical manner as shown in FIGS. 32 and 33. In this manner, it is possible to provide even a corner table unit 7 where necessary.

The units shown in FIGS. 10 and 12 are complete units in themselves. The unit of FIG. 10 is provided with arm rests while the unit of FIG. 12 is not. However, the unit of FIG. 12 is adapted for center arm rests because of the mounting holes 36 in its frame member 37. Also, the unit can be lengthened by removing a leg 3 and using the leg connection to connect it to another frame member. Another leg 3 with the bracket of the type shown in FIGS. 23 and 24 can be applied directly beneath one of the seat units 5 in combination with the seat brackets 9 and 10. In a similar manner, the arm rests shown on unit of FIG. 10 can be removed as required, and the legs can be rearranged or the unit can be lengthened by removing one of the arm rests and attaching the connecting portions of the frame member to another frame member, as already described.

Figure 14:
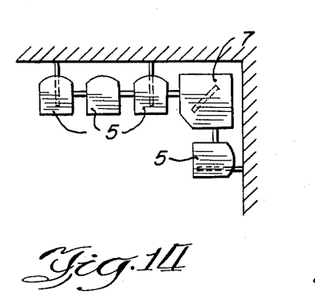
Figure 15:
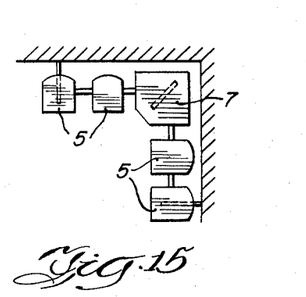
Figure 16:
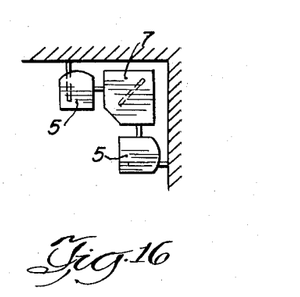
Figure 17:
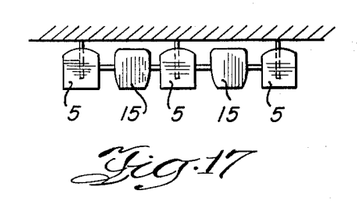
Figure 18:
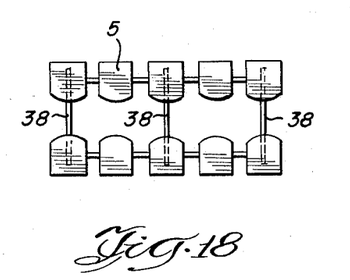
Figure 19:
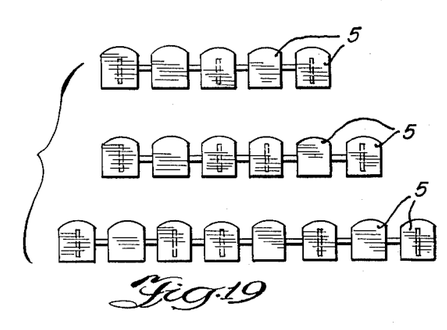

FIGS. 13 through 19 show various arrangements which can be easily produced by rearrangement of parts of the types already described. For example, in FIG. 13, there is shown five seating units 5 and a corner table unit 7. In FIG. 14 is shown four seating units 5 and a corner table 7. In FIG. 15 is shown another arrangement of four seat units 5 and a corner table unit 7. In FIG. 16 is shown two seating units 5 and a corner table unit 7. In FIG. 17 is shown three seating units 5 and two table units 15. FIG. 18 shows 10 seating units 5 with five mounted back to back. Special connecting members 38 are required. In FIG. 19 is shown three arrangements of seating units, the first being five seating units 5 in a row, the second being six seating units 5 in a row and the third being eight seating units 5 in a row. Any number of units can be used in a substantial number of combinations.

With the basic modular units suggested and shown and the versatile connections used, the structure provides means for easily converting to many different seating and table arrangements as desired or may be necessary because of space requirements.

Although the invention has been shown in various different ways, it should be clearly understood that the invention can be made in still other ways without departing from the true scope of the invention as defined by the appended claims.

I claim:

1. The combination in a multiple function furniture structure comprising, an elongated frame member, a plurality of legs, and a plurality of separate and distinct functional furniture members connecting portions spaced along the frame member, certain of said connecting portions having means engageable with the legs for connecting the legs at different locations along the frame member and to extend below the frame member, and other certain of said connecting portions having means engageable with the functional furniture members for connecting the members to extend above the frame member.

2. The combination defined by claim 1 characterized by, at least one of said functional furniture members being of a different width than another, the spacing of said connecting portions along a rectilinear portion of the frame member compared to the widths of all of the functional furniture members being such that all of the members regardless of their respective widths can be arranged in different sequences along the rectilinear portion of the frame member with separations between the members.

3. The combination defined by claim 1 characterized by, said frame member being divisible into a plurality of shorter members connected end to end.

4. The combination defined by claim 1 characterized by, said frame member being divisible into a plurality of shorter members connected end to end, at least one of said shorter members being non-rectilinear so that when it is connected between two other shorter members, the other shorter members extend from it in different directions.

5. The combination defined by claim 2 characterized by, said shorter members having lengths which are divided into substantially equal incremental lengths with a connecting portion at each incremental length to which at least one portion of a functional furniture member can be connected.

6. The combination in a furniture structure comprising, an elongated frame member, a plurality of legs, and a plurality of functional furniture members, connecting portions spaced along the frame member, certain of said connecting portions having means engageable with the legs for connecting the legs to extend below the frame member and other certain of said connecting portions having means engageable with the functional furniture members for connecting the members to extend above the frame member, said frame member having a connecting portion on at least one of its ends which readily mates with a connecting portion on one end of another similar frame member for the purpose of joining together the frame members lengthwise and lengthening the furniture structure, at least one said frame member being rectilinear and other connected to it being non-rectilinear.

7. The combination in a furniture structure comprising, an elongated frame member suitably supported above a supporting surface by means of legs connected to the frame member and extending downwardly therefrom, a functional furniture member disposed above said frame member and joined thereto by a connector, said connector comprising a plate having an L-shaped cross-section formed by a web portion facing upward and connected along one of its edges to a vertical web portion extending downwardly therefrom, said vertical web portion having a notch separating it into two parts, the notch being the width of the thickness of the frame member so that the vertical web portion fits with the frame member between the two parts of the vertical web portion, said two parts of the vertical web portion being provided with tabs projecting laterally away from the notch with one tab positioned on one side of the frame member and another positioned on the opposite side of the frame member, said tabs being secured to the frame by means of a fastener extending through the tabs and the frame member.

8. The combination in a furniture structure comprising, an elongated frame member suitably supported above a supporting surface by means of legs connected to the frame member and extending downwardly therefrom, a functional furniture member disposed above said frame member and joined thereto by a connector, said connector comprising a plate having a first web portion facing upward and connected to a second web portion extending downwardly therefrom, said second web portion having a notch separating it into two parts, the notch being the width of the thickness of the frame member so that the second web portion fits with the frame member between the two parts of the second web portion, at least one of said two parts being provided with a tab projecting laterally away from the notch, said tab being secured to the frame member by means of a fastener connected between the frame member and the tab.

9. The combination in a furniture structure comprising, an elongated frame member suitably supported above a supporting surface by means of legs connected to the frame member and extending downwardly therefrom, a functional furniture member disposed above said frame member and joined thereto by a connector, said connector comprising a plate having a first web portion facing upward and connected to a second web portion extending downwardly therefrom, said second web portion having a notch separating it into two parts, the notch being the width of the thickness of the frame member so that the second web portion fits with the frame member between the two parts of the second web portion, at least one of said two parts being provided with a tab projecting laterally away from the notch, said tab being secured to the frame member by means of a fastener connected between the frame member and the tab, said frame member having a connecting portion on at least one of its ends which readily mates with a connecting portion on one end of another similar frame member for the purpose of joining together the frame members lengthwise and lengthening the furniture structure.

References Cited by the Examiner

UNITED STATES PATENTS

| | | | |
|---|---|---|---|
| 1,351,995 | 9/1920 | Cornish | 296—232 |
| 1,970,965 | 8/1934 | Leake | 189—36 |
| 2,812,800 | 11/1957 | Eames | 297—239 |
| 2,965,161 | 12/1960 | Knoll | 297—440 |
| 3,041,107 | 6/1962 | Schaffer | 297—248 |
| 3,093,410 | 6/1963 | Wilson | 297—440 |
| 3,124,390 | 3/1964 | Eames et al. | 297—232 X |

FOREIGN PATENTS

| | | |
|---|---|---|
| 23,530 | 1905 | Great Britain. |
| 303,845 | 1/1929 | Great Britain. |
| 882,945 | 11/1961 | Great Britain. |
| 1,273,714 | 9/1961 | France. |
| 586,910 | 10/1933 | Germany. |

FRANK B. SHERRY, *Primary Examiner.*

J. T. McCALL, *Assistant Examiner.*